(12) United States Patent
Muthiah et al.

(10) Patent No.: US 11,775,210 B2
(45) Date of Patent: Oct. 3, 2023

(54) STORAGE SYSTEM AND METHOD FOR DEVICE-DETERMINED, APPLICATION-SPECIFIC DYNAMIC COMMAND CLUSTERING

(71) Applicant: Western Digital Technologies, Inc., San Jose, CA (US)

(72) Inventors: Ramanathan Muthiah, Bangalore (IN); Narendhiran Chinnaanangur Ravimohan, Bangalore (IN); Balaji Thraksha Venkataramanan, Bangalore (IN); Ramkumar Ramamurthy, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/177,505

(22) Filed: Feb. 17, 2021

(65) Prior Publication Data

US 2022/0113904 A1    Apr. 14, 2022

Related U.S. Application Data

(60) Provisional application No. 63/091,512, filed on Oct. 14, 2020.

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0659; G06F 3/0604; G06F 3/0673
See application file for complete search history.

(56) References Cited

U.S. PATENT DOCUMENTS 6,151,660 A * 11/2000 Aoki .................. G06F 12/0866
                                                        711/E12.019
6,295,391 B1 * 9/2001 Rudd ................. H04N 1/00204
                                                        382/312

(Continued)

FOREIGN PATENT DOCUMENTS

WO    WO 2014/209764 A1    12/2014

OTHER PUBLICATIONS

Atmel Corporation, Using CryptoMemory® in Full I2C Compliant Mode, https://ww1.microchip.com/downloads/en/Appnotes/doc8662.pdf (Year: 2009).*

(Continued)

*Primary Examiner* — Charles Rones
*Assistant Examiner* — Alexander Vinnitsky
(74) *Attorney, Agent, or Firm* — Crowell Moring LLP

(57) ABSTRACT

A storage system and method for device-determined, application-specific dynamic command clustering are provided. In one embodiment, the storage system comprises a memory and a controller. The controller is configured to analyze commands received from a host to detect a pattern of a plurality of commands; inform the host of the pattern; receive, from the host, a single command comprising an identifier associated with the plurality of commands; and in response to receiving the single command from the host, executing the plurality of commands. Other embodiments are provided.

20 Claims, 8 Drawing Sheets

(56) References Cited

U.S. PATENT DOCUMENTS

| | | | |
|---|---|---|---|
| 7,848,145 B2* | 12/2010 | Mokhlesi | H01L 27/11582 |
| | | | 365/72 |
| 9,535,849 B2* | 1/2017 | Kegel | G06F 12/1081 |
| 9,747,039 B1 | 8/2017 | Coleman et al. | |
| 10,642,502 B2 | 5/2020 | Sharon et al. | |
| 10,649,776 B2 | 5/2020 | Navon et al. | |
| 2002/0091830 A1* | 7/2002 | Muramatsu | G06F 3/1454 |
| | | | 709/227 |
| 2005/0166013 A1* | 7/2005 | Espeseth | G06F 3/0632 |
| | | | 711/112 |
| 2013/0297894 A1* | 11/2013 | Cohen | G06F 12/00 |
| | | | 711/154 |
| 2014/0136798 A1* | 5/2014 | Stark | G06F 9/34 |
| | | | 711/147 |
| 2015/0169359 A1* | 6/2015 | Busaba | G06F 3/0617 |
| | | | 711/147 |
| 2016/0062669 A1 | 3/2016 | Chu et al. | |
| 2016/0306580 A1 | 10/2016 | Pinto | |
| 2017/0177541 A1 | 6/2017 | Berman et al. | |
| 2020/0004430 A1 | 1/2020 | Navon et al. | |
| 2020/0371940 A1 | 11/2020 | Navon et al. | |

OTHER PUBLICATIONS

U.S. Appl. No. 16/708,107, filed Dec. 9, 2019, entitled "Storage System and Sorting-Based Method for Random Read Command Prediction in a Multi-Queue System."

* cited by examiner

STORAGE SYSTEM AND METHOD FOR DEVICE-DETERMINED, APPLICATION-SPECIFIC DYNAMIC COMMAND CLUSTERING

CROSS-REFERENCE TO RELATED APPLICATION

This application claims the benefit of U.S. provisional patent application No. 63/091,512, filed Oct. 14, 2020, which is hereby incorporated by reference.

BACKGROUND

A host can store data in and retrieve data from a memory in a storage system. In operation, a host sends multiple write and/or read commands to the storage system. The storage system stores the commands in a command queue and accesses the commands one after the other from the queue. Low-cost storage systems can have a relatively-small command queue depth. In such systems, commands can be queued in the command queue as different tasks with different task identifiers. Because the command queue depth is relatively small, the input-output operations per second (IOPS) is limited in such systems because the backend resources are not optimally utilized.

DETAILED DESCRIPTION

Overview

Figure 1A:
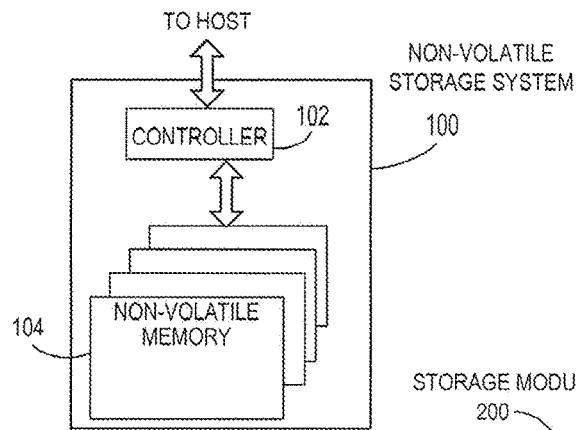
FIG. 1A is a block diagram of a non-volatile storage system of an embodiment.

By way of introduction, the below embodiments relate to a storage system and method for device-determined, application-specific dynamic command clustering. In one embodiment, a storage system is provided comprising a memory and a controller. The controller is configured to analyze commands received from a host to detect a pattern of a plurality of commands; inform the host of the pattern; receive, from the host, a single command comprising an identifier associated with the plurality of commands; and in response to receiving the single command from the host, executing the plurality of commands.

In some embodiments, the controller is further configured to perform address look-ups for the each of the plurality of commands in parallel.

In some embodiments, the controller is further configured to generate the identifier and send the identifier to the host prior to receiving the single command from the host.

In some embodiments, the controller is further configured to generate the identifier in response to the pattern repeating a threshold number of times.

In some embodiments, the controller is further configured to dynamically change an association of the identifier to a different plurality of commands.

In some embodiments, the identifier is generated by the host.

In some embodiments, the controller is further configured to receive an instruction from the host regarding an association between the identifier and the plurality of commands.

In some embodiments, the instruction is received via a vendor-specific command.

In some embodiments, the controller is further configured to send a request to the host to associate the identifier with a different plurality of commands.

In some embodiments, the plurality of commands comprise different logical address.

In some embodiments, the plurality of commands request data of different lengths.

In some embodiments, the plurality of commands comprising random write commands and/or random read commands.

In some embodiments, the memory comprises a three-dimensional memory.

In another embodiment, a method is provided that is performed in host in communication with a storage system. The method comprises: analyzing commands to be sent to the storage system to identify a cluster of commands, wherein the cluster is identified by a cluster identifier; sending an association of the cluster identifier and the cluster of commands to the storage system; and sending, to the storage system, a single command comprising the cluster identifier instead of individual commands in the cluster.

In some embodiments, the association is send to the storage system via a vendor-specific command.

In some embodiments, the cluster of commands comprising random write commands and/or random read commands with different logical addresses and/or data lengths.

In some embodiments, the association depends on an application issuing the commands.

In another embodiment, a storage system is provided comprising: a memory; means for detecting a pattern of a plurality of commands received from a host; means for providing the host with an identifier for the plurality of commands; and means for executing the plurality of commands in response to receiving the identifier from the host.

In some embodiments, the plurality of commands comprise different logical address and/or request data of different lengths.

In some embodiments, the plurality of commands comprise random write commands and/or random read commands.

Other embodiments are possible, and each of the embodiments can be used alone or together in combination. Accordingly, various embodiments will now be described with reference to the attached drawings.

Embodiments

Figure 1B:
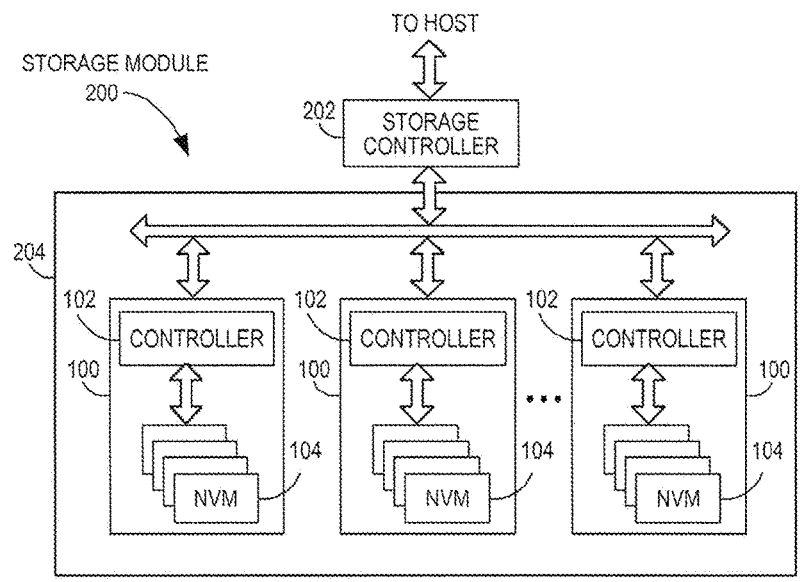
FIG. 1B is a block diagram illustrating a storage module of an embodiment.
Figure 1C:
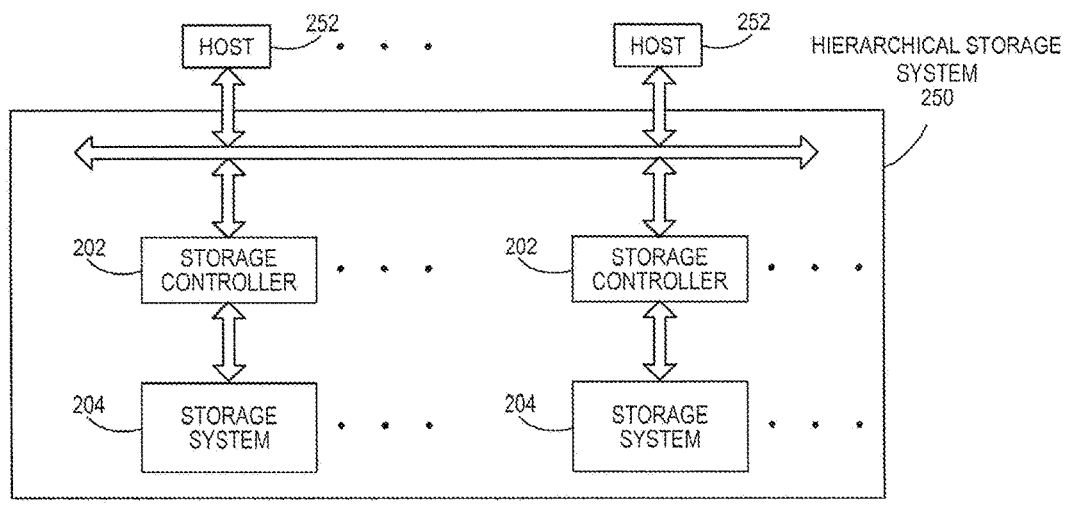
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
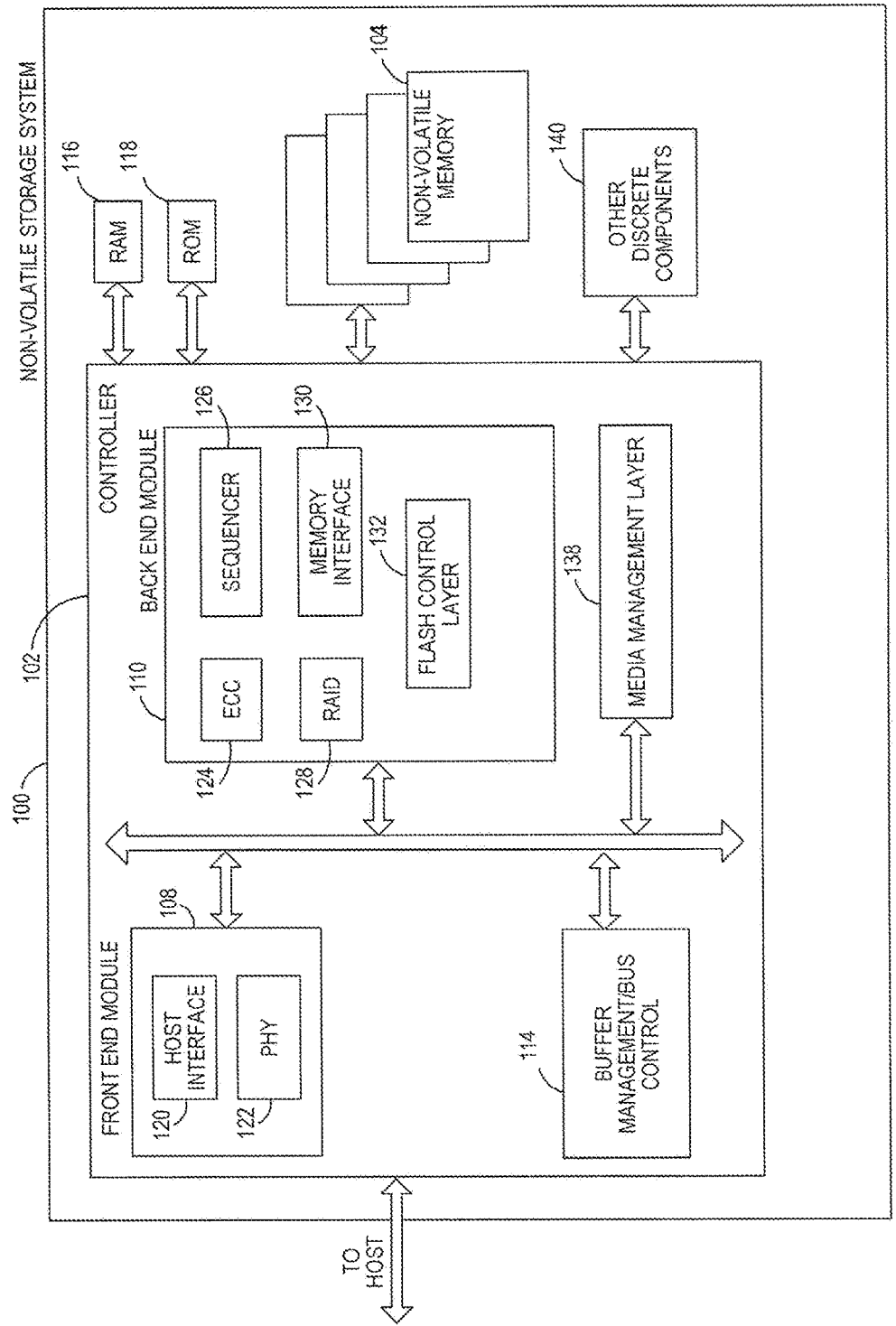
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
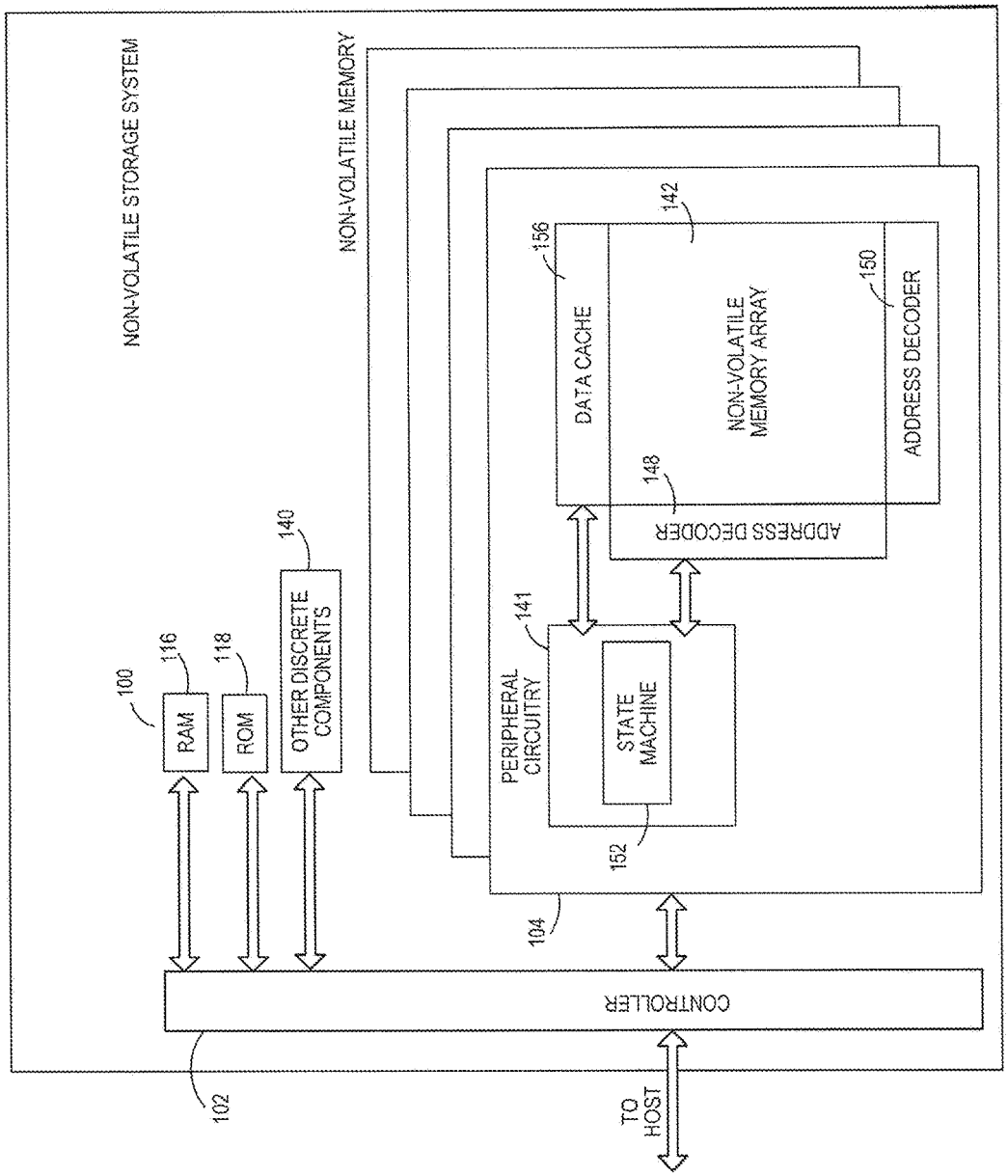
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
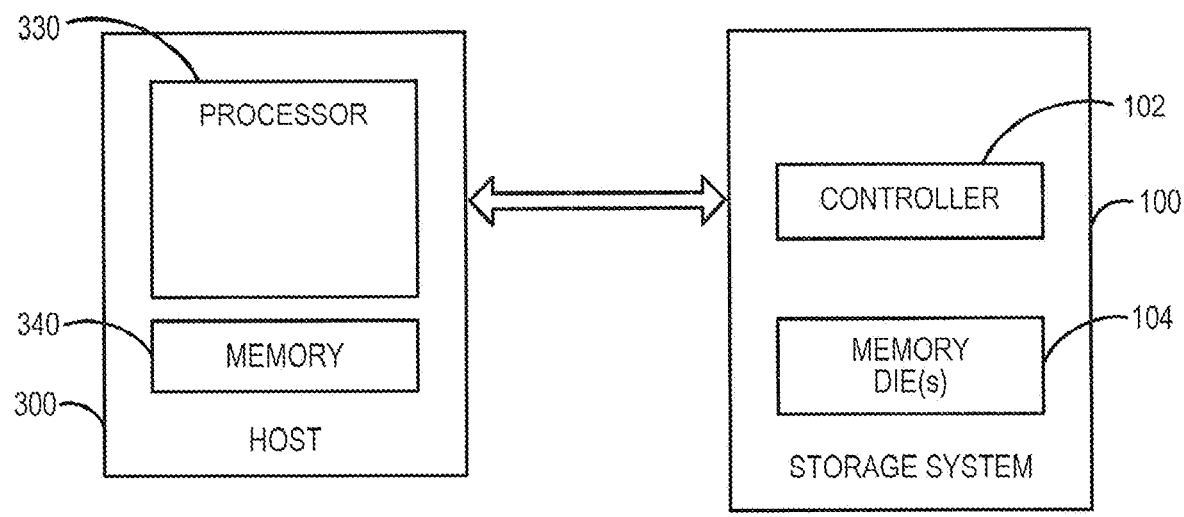
FIG. 3 is a block diagram of a host and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

As mentioned above, a host can store data in and retrieve data from a memory in a storage system (sometimes referred to herein as a "device"). In operation, the host can send multiple write and/or read commands to the storage system, and the storage system can store the commands in a command queue and access the commands one after the other from the queue. For example, legacy Secure Digital (SD) memory cards are one-command-at-a-time systems, wherein the memory card accesses one command after the other irrespective of random or sequential access.

Owing to the cost of hardware and memory for a queue (cache), low-cost storage systems can have product specifications that are tuned toward lower-depth command queues. As a result, low-cost storage systems (e.g., SATA solid state drives (SSDs)) can have a relatively-small command queue depth compared to higher-cost storages system. In such low-cost systems, commands can be queued in the command queue as different tasks with different task identifiers. Still, because the command queue depth is relatively small (i.e., the maximum command queue depth is limited), the input-output operations per second (IOPS) is limited in such systems because the backend resources are not optimally utilized.

Command queue depth is also an important factor in determining the random performance of the storage device. However, random commands (read or write) are not usually entirely random, as host applications tend to read and write data based on a flow. Based on different applications, the commands may be pseudo random, where a certain deterministic sequence of data is accessed even during random accesses. The following embodiments can be used to attempt to leverage the pseudo-random access mode of data seen in practice.

Figure 4:
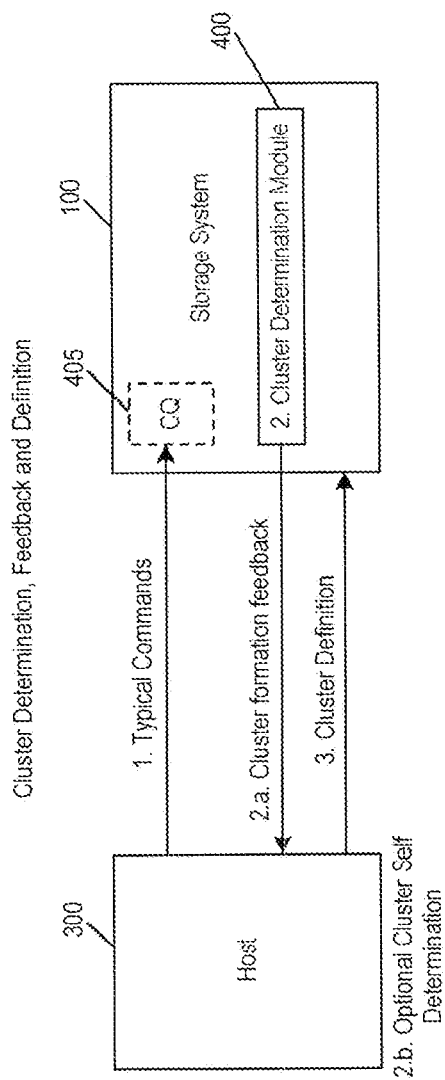
FIG. 4 is a block diagram of a host and storage system of an embodiment, where the storage system comprises a cluster determination module.

Turning again to the drawings, FIG. 4 is a block diagram of a storage system 100 and host 300 that can be used in an embodiment. As shown in FIG. 4, the storage system 100 in this embodiment comprises a cluster determination module 400 and a command queue (CQ) 405. The cluster determination module 400 can comprise computer-readable code executed by the controller 102. In operation, the host 300 sends typical read and/or write commands to the storage system 100 (act 1). These commands are stored in the command queue 405 in the storage system 100.

The cluster determination module 400 (or, more generally, the controller 102) then analyzes these commands to attempt to detect a repeatable pattern (cluster) of commands (act 2). For example, in a gaming application, the host 300 may read the following pseudo-random pattern: 8 sectors from logical address (LBA) 0x1200, 8 sectors from LBA 0x5100, and 8 sectors from LBA 0x6000. The controller 102 in this embodiment can analyze the commands received from the host 300 to detect such a pattern and inform the host 300 of the pattern, which is referred to as cluster formation feedback (act 2a) in FIG. 4. (The storage system 100 can analyze commands and provide feedback per application running on the host 300.) If the host 300 agrees that this pattern is to be repeated in the future, the host 300 can send a cluster definition back to the storage system (act 3) that associates the three commands with a single command. In the above example, the cluster definition (CD) can be: CD1→0x1200, 0x8, 0x5100, 0x8, 0x6000, and 0x8. So, the next time the host 300 wants these three commands executed, it merely sends a single command Cluster Command 1 to the storage system 100, instead of the three individual commands.

Based on the cluster definition, the storage system 100 would know that the single command Cluster Command 1 is "shorthand" for these three commands. So, with this embodiment, the host 300 uses only one index to trigger a cluster of commands being executed by the storage system 100. In contrast, typical systems would require three indices to accomplish the same task. This solves the "low-command-queue-depth" problem mentioned above because, in this embodiment, the storage system 100 would only store one command (the single "shorthand" command) instead of the three individual commands in the command queue 405.

Figure 5:
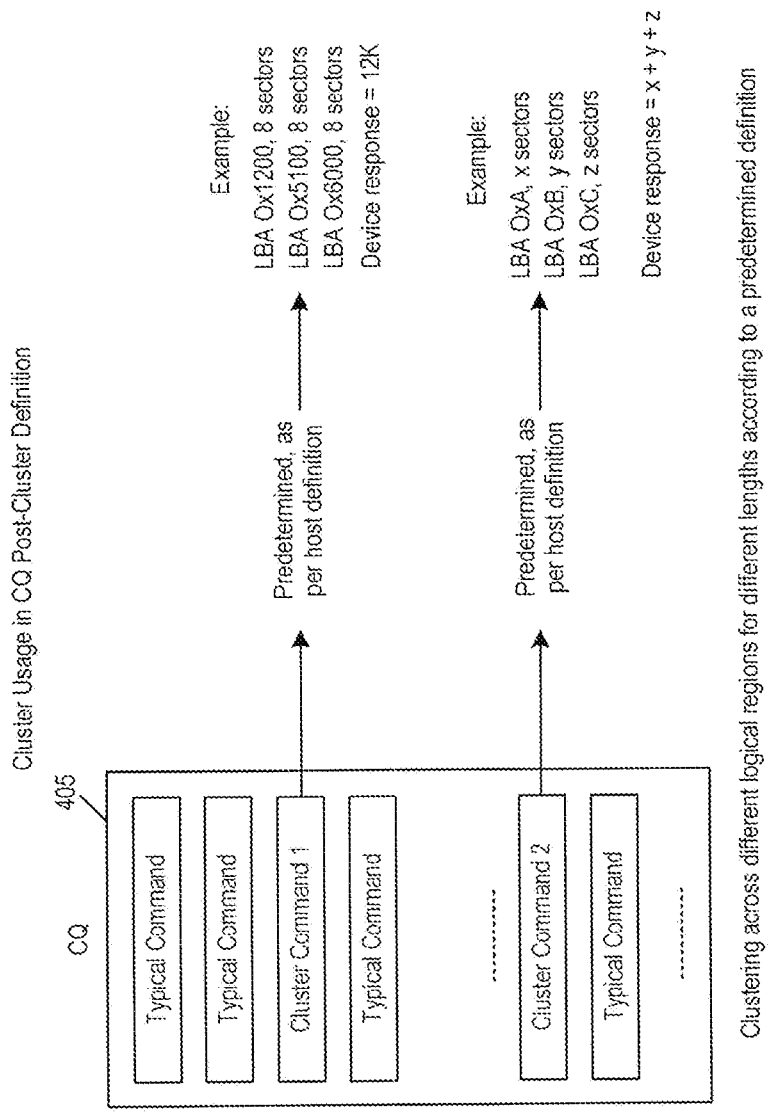
FIG. 5 is an illustration of a command queue of an embodiment.

This embodiment is further illustrated in FIG. 5. As used herein, a cluster command is an integration of a plurality of commands. In one particular implementation, the plurality of commands are random read and/or write commands from different logical addresses and/or different lengths. With the commands having different logical addresses across different logical regions, the controller 102 can perform address look-ups for each of the plurality of commands in parallel. Of course, this is just one implementation, and other implementations can be used.

Figure 6:
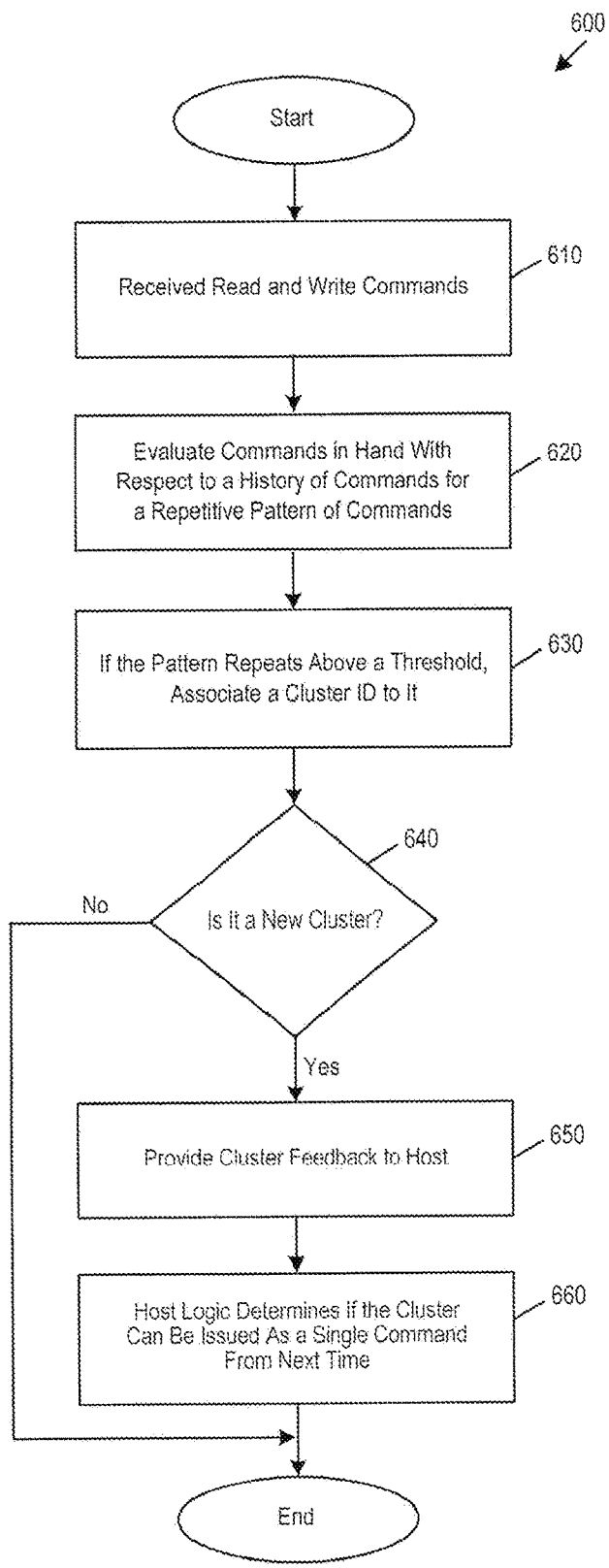
FIG. 6 is a flow chart of a method of an embodiment for a storage system to provide a cluster suggestion to a host.

The association between the single command and its component commands can be made in any suitable way. For example, in one embodiment, the storage system 100 makes the associations. This example is illustrated in the flow chart 600 in FIG. 6. As shown in FIG. 6, in this embodiment, the storage system 100 receives read and/or write commands from the host 300 (cat 610). Then, the controller 102 evaluates the commands in hand with respect to a history of commands for a repetitive pattern of commands (act 620). If the pattern repeats above a threshold, the controller 102 associates a cluster identifier (ID) to it (act 630). The controller 102 then determines if the cluster ID is for a new cluster (act 640). If it is, the controller provide the cluster feedback to the host 300 (act 650). The host 300 then determines if the cluster can be issued as a single command in the future (act 660). Later, the controller 102 can dynamically change an association of the identifier to a different plurality of commands. So, the controller 102 can dynamically suggest new clusters, as well as request reset of existing clusters, based on learning from command patterns. Clustering feedback and the cluster definition can change dynamically for different applications.

Figure 7:
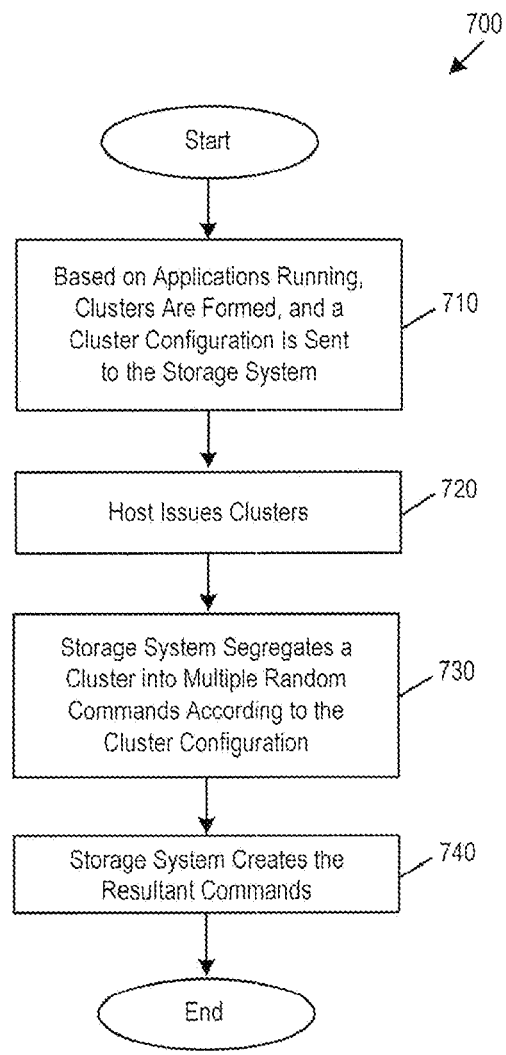
FIG. 7 is a flow chart of a method of an embodiment for a host to generate a cluster identifier and provide it to a storage system.

In another embodiment, the association between the single command and its component commands is made by the host 300 (e.g., per host application). This example is illustrated in the flow chart 700 in FIG. 7. As shown in FIG. 7, based on applications running in the host 300, the host 300 forms clusters of commands and sends a cluster configuration associating the cluster of commands and the cluster ID to the storage system 100 (act 710). This cluster configuration is an instruction containing the association between the identifier and the plurality of commands. This instruction can be sent to the storage system 100, for example, via a vendor-specific command. Next, the host 300 issues the clusters (act 720). In response, the storage system 100 segregates a cluster into multiple commands according to the cluster configuration (act 730). Finally, the storage system 100 creates the resulting commands (act 740). Later, the storage system 100 can send a request to the host 300 to associate the identifier with a different plurality of commands.

There are several advantages associated with these embodiments. As described above, in prior storage systems, commands are typically accessed one after another, or different command task identifiers can be used. With these embodiments, the storage system 100 (or host 300) recognizes a pattern of commands over time and suggests clustering of the repeating commands. By identifying a pseudo-random access pattern and suggesting feedback on possible clustering of certain commands to the host 300, the host 300 can coalesce several random commands based on the feedback and issue the commands with a cluster index (e.g., with the cluster field on, thereby reusing the same command index). The storage system 100 can parse the cluster command according to the proposed prior host definition and optimize its backend resources to perform parallel processing of multiple random commands integrated under a cluster, alongside other clusters and commands. In this way, one host command can result in multiple sub-host commands, thereby triggering multiple logical-to-physical address map accesses and corresponding multiple backend/write/read operations in parallel. As such, these embodiments can virtually increase the maximum command depth possible in a storage specification. For example, considering SD CQ and SATA SSD systems where the maximum command queue depth is 32. Cluster commands per these embodiments can extend the number of commands the storage system's backend gets to process at any point of time, thereby parallelizing the resources leading to increased random input-output operations per second (TOPS). Out of 32 commands, if five of them can be clustered, each with three commands, the virtual command queue depth increases to 27+5*3=42.

There are many alternatives that can be used with these embodiments. For example, while some of the above examples were discussed in terms of random read commands, these embodiments can also be used with random write commands. The host 300 can cluster file system updates (standard logical block address (LBA)) with a sequential write command without breaking the command queue indexes for random writes. Additionally, the storage system 100 can choose to group an entire cluster and create a wrapper logical-to-physical transition addressing for the cluster group on top of the existing LBA-based addressing. This would mean that the cluster can be programmed in adjacent physical addresses utilizing the memory dies parallelism during write and one logical-to-physical translation page fetch from the memory 104 instead of multiple fetches in case of read (e.g., in a limited random access memory system).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
    a memory; and
    a controller configured to:
        analyze commands received from a host to detect a pattern of a plurality of commands, wherein the plurality of commands comprises a plurality of logical addresses across a plurality of logical regions of the memory;
        based on the detected pattern:
            create a wrapper logical-to-physical translation address for a possible new cluster comprising certain ones of the plurality of commands, wherein the wrapper logical-to-physical translation address is in addition to existing logical addresses of the certain ones of the plurality of commands; and
            provide feedback to the host on the possible new cluster;
        receive, from the host, a cluster definition that associates a single cluster command with the certain ones of the plurality of commands;
        receive the single cluster command from the host;
        store the single cluster command in a command queue, wherein storing the single cluster command instead of the certain ones of the plurality of commands increases a capacity of the command queue to store other commands;
        parse the single cluster command to identify the certain ones of the plurality of commands per the cluster definition;
        perform a single logical-to-physical translation page fetch from the memory to determine a plurality of physical addresses associated with the wrapper logical-to-physical translation address instead of performing multiple logical-to-physical translation page fetches from the memory for logical addresses of the certain ones of the plurality of commands; and
        execute the certain ones of the plurality of commands to program adjacent physical addresses in the memory in parallel utilizing memory dies parallelism during write.

2. The storage system of claim 1, wherein the controller is further configured to provide the feedback to the host in response to the detected pattern repeating a threshold number of times.

3. The storage system of claim 1, wherein the controller is further configured to dynamically change the cluster definition.

4. The storage system of claim 1, wherein the controller is further configured to receive, from the host, a change to the cluster definition.

5. The storage system of claim 1, wherein the cluster definition is received via a vendor-specific command.

6. The storage system of claim 1, wherein the controller is further configured to inform the host of a second pattern of a different plurality of commands.

7. The storage system of claim 1, wherein the plurality of commands comprises random write commands.

8. The storage system of claim 1, wherein the memory comprises a three-dimensional memory.

9. The storage system of claim 1, wherein the plurality of commands comprises random read commands.

10. The storage system of claim 1, wherein the cluster definition depends on an application issuing the plurality of commands.

11. A method comprising:
    performing the following in a storage system comprising a memory and in communication with a host:
        analyzing commands received from the host to detect a pattern of a plurality of commands, wherein the plurality of commands comprises a plurality of logical addresses across a plurality of logical regions of the memory;
        based on the detected pattern:
            creating a wrapper logical-to-physical translation address for a possible new cluster comprising certain ones of the plurality of commands, wherein the wrapper logical-to-physical translation address is in addition to existing logical addresses of the certain ones of the plurality of commands; and
            providing feedback to the host on the possible new cluster;
        receiving, from the host, a cluster definition that associates a single cluster command with the certain ones of the plurality of commands;
        receiving the single cluster command from the host;
        storing the single cluster command in a command queue, wherein storing the single cluster command instead of the certain ones of the plurality of commands increases a capacity of the command queue to store other commands;
        parsing the single cluster command to identify the certain ones of the plurality of commands per the cluster definition;
        performing a single logical-to-physical translation page fetch from the memory to determine a plurality of physical addresses associated with the wrapper logical-to-physical translation address instead of performing multiple logical-to-physical translation page fetches from the memory for logical addresses of the certain ones of the plurality of commands; and
        executing the certain ones of the plurality of commands to program adjacent physical addresses in the memory in parallel utilizing memory dies parallelism during write.

12. The method of claim 11, wherein the cluster definition is received via a vendor-specific command.

13. The method of claim 11, wherein the plurality of commands comprises random write commands.

14. The method of claim 11, wherein the cluster definition depends on an application issuing the plurality of commands.

15. The method of claim 11, further comprising providing the feedback to the host in response to the detected pattern repeating a threshold number of times.

16. The method of claim 11, further comprising dynamically changing the cluster definition.

17. The method of claim 11, further comprising receiving, from the host, a change to the cluster definition.

18. The method of claim 11, wherein the plurality of commands comprises random read commands.

19. The method of claim 11, further comprising informing the host of a second pattern of a different plurality of commands.

20. A storage system comprising:
a memory;
means for analyzing commands received from a host to detect a pattern of a plurality of commands, wherein the plurality of commands comprises a plurality of logical addresses across a plurality of logical regions of the memory;
means for performing the following based on the detected pattern:
creating a wrapper logical-to-physical translation address for a possible new cluster comprising certain ones of the plurality of commands, wherein the wrapper logical-to-physical translation address is in addition to existing logical addresses of the certain ones of the plurality of commands; and
providing feedback to the host on the possible new cluster;
means for receiving, from the host, a cluster definition that associates a single cluster command with the certain ones of the plurality of commands;
means for receiving the single cluster command from the host;
means for storing the single cluster command in a command queue, wherein storing the single cluster command instead of the certain ones of the plurality of commands increases a capacity of the command queue to store other commands;
means for parsing the single cluster command to identify the certain ones of the plurality of commands per the cluster definition;
means for performing a single logical-to-physical translation page fetch from the memory to determine a plurality of physical addresses associated with the wrapper logical-to-physical translation address instead of performing multiple logical-to-physical translation page fetches from the memory for logical addresses of the certain ones of the plurality of commands; and
means for executing the certain ones of the plurality of commands to program adjacent physical addresses in the memory in parallel utilizing memory dies parallelism during write.

\* \* \* \* \*